(12) United States Patent
Whitten et al.

(10) Patent No.: US 11,661,289 B2
(45) Date of Patent: May 30, 2023

(54) DYNAMIC SPIDER GUIDE

(71) Applicant: ILLINOIS TOOL WORKS INC., Glenview, IL (US)

(72) Inventors: Jimmy D. Whitten, Westminster, SC (US); Anthony T. Burns, Fountain Inn, SC (US); Jeffrey T. Allison, Seneca, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/509,881

(22) Filed: Oct. 25, 2021

(65) Prior Publication Data

US 2022/0127084 A1    Apr. 28, 2022

Related U.S. Application Data

(60) Provisional application No. 63/105,557, filed on Oct. 26, 2020.

(51) Int. Cl.
  *B65G 47/51*    (2006.01)
  *B65G 23/44*    (2006.01)
  *B65G 47/52*    (2006.01)

(52) U.S. Cl.
  CPC ......... *B65G 47/5163* (2013.01); *B65G 23/44* (2013.01); *B65G 47/52* (2013.01); *B65G 2201/0244* (2013.01)

(58) Field of Classification Search
  CPC .... B65G 47/51; B65G 47/5163; B65G 23/44; B65G 47/52; B65G 2201/0244
  USPC .................................................... 198/347.1
  See application file for complete search history.

(56) References Cited

U.S. PATENT DOCUMENTS

| 5,772,005 | A  | * | 6/1998  | Hansch .............. | B65G 47/5131 198/594    |
|-----------|----|---|---------|----------------------|-------------------------|
| 6,152,291 | A  |   | 11/2000 | Steeber et al.       |                         |
| 6,230,874 | B1 | * | 5/2001  | Steeber ................. | B65G 47/52 198/457.06 |
| 6,523,669 | B1 | * | 2/2003  | Steeber .............. | B65G 47/5131 198/370.01 |
| 6,698,581 | B2 | * | 3/2004  | Steeber .............. | B65G 47/5131 198/370.01 |

(Continued)

FOREIGN PATENT DOCUMENTS

DE    102018005616    *  1/2020  ......... B65G 47/5113

OTHER PUBLICATIONS

U.S. Patent Office, English language version of the International Search Report, Form PCT/ISA/210 for International Application PCT/US2021/056658, dated Feb. 14, 2022 (5 pages).

(Continued)

*Primary Examiner* — James R Bidwell
(74) *Attorney, Agent, or Firm* — Pauley Erickson & Swanson

(57) ABSTRACT

A transfer device for use with a conveying apparatus for controlling the flow of articles, including a first conveyor and a second conveyor. The transfer device is disposed generally across and movable along the first and second conveyors. The transfer device includes a belt guide attached to the transfer device. The belt guide includes a base configured to attach to an actuating frame of the transfer device and a tension roller that slideably engages with a portion of the base to aid in conveying articles between the first conveyor and second conveyor.

21 Claims, 4 Drawing Sheets

(56) References Cited

U.S. PATENT DOCUMENTS

| | | | |
|---|---|---|---|
| 7,032,742 B2 * | 4/2006 | Hartness | B65G 47/5131 |
| | | | 198/444 |
| 9,682,828 B2 | 6/2017 | Beesley | |
| 9,981,809 B2 * | 5/2018 | Hanselman | B65G 15/02 |

OTHER PUBLICATIONS

U.S. Patent Office, English language version of the Written Opinion of the ISA, Form PCT/ISA/237 for International Application PCT/US2021/056658, dated Feb. 14, 2022 (6 pages).

* cited by examiner

DYNAMIC SPIDER GUIDE

CROSS REFERENCE TO RELATED APPLICATION(S)

This application claims the benefit of U.S. Provisional Application Ser. No. 63/105,557, filed on 26 Oct. 2020. The provisional application is hereby incorporated by reference herein in its entirety and is made a part hereof, including but not limited to those portions which specifically appear hereinafter.

BACKGROUND OF THE INVENTION

Field of the Invention

This invention relates generally to a transfer device: or spider guide for use with a conveyor system and, more particularly, to a dynamic spider guide with a belt and tension roller to increase efficiency of the system.

Description of Prior Art

There are a variety of types of conveyors anal conveyor systems that seek to move various articles through a system. The system often includes an infeed conveyor and an outfeed conveyor. That is, two conveyors often traveling in the opposite direction. To move objects, such as bottles, from one conveyor to another, an additional device may be used for controlling the transfer of articles from one conveyor onto another. This additional device seeks to control the flow of articles traveling through the system such as when the infeed and outfeed conveyors are running at different speeds. This additional device, often referred to as a spider system, can accumulate or store articles when the capacity of the outfeed conveyor is either shut down or run at a speed where the outfeed conveyor cannot handle the number of articles being fed by the infeed conveyor.

These additional spider devices transfer products from one conveyor to another traveling in different directions. Applicant has developed several such devices such as, for example, U.S. Pat. No. 6,523,669 entitled. "Article, Guide for an Apparatus for Controlling the Flow of Articles," and U.S. Pat. No. 9,682,828 entitled, "Accumulation Device and Transfer Device for Same," both of which are hereby incorporated by reference. However, spider devices or guides may include problematic packages traveling on the conveyor systems that slide away from an edge or fence on a conveyor. This can cause additional back-ups or delays when moving packages. A transfer wheel may be used to facilitate the movement of packages or articles across the space between the juiced and outfeed conveyors. Packages that are not accurately placed on a conveyor can delay the movement between the conveyors as the packages contact the transfer wheel which in turn may cause back-ups and jams on the infeed conveyor system. Therefore, an improved system is needed to accurately and efficiently transfer items between conveyor systems.

SUMMARY OF THE INVENTION

The invention generally relates to a transfer device for transferring articles amongst conveyor systems. The general object of the invention can be attained, at least in part, through an apparatus for controlling the flow of articles. The apparatus includes a first conveyor driven in a first direction to convey articles in the first direction. The apparatus also includes a second conveyor driven in a second direction to convey articles in the second direction. The second direction is typically opposite the first direction.

A transfer device is disposed generally across and movable along the first and second conveyors. The transfer device may include an actuating frame adapted to pivot about the first and second conveyors, a drive member rotatably mounted to the actuating frame and drivingly engaged by the first and second conveyors, and an outer guide and an inner guide configured to define a transfer path for a plurality of articles to travel across the actuating frame between the first conveyor and the second conveyor. The drive member may continuously rotate as either of the first and second conveyors move, and the transfer device travels along the first and second conveyors if a speed difference exists between the first and second conveyors.

The apparatus further includes a belt guide attached to the transfer device. The belt guide includes a base attachable to the actuating frame of the transfer device downstream of the drive member. The belt guide may also include a tension roller that slideably engages with a portion of the base. Additionally, the belt guide included a belt that is operatively connected to the tension roller. The belt preferably wraps around a portion of the drive member along the transfer path. The belt guide may also be removably attached to the transfer device. The base of the belt guide further includes an infeed attachment member and an outfeed attachment member. The infeed attachment member connects the belt guide to the first conveyor and the outfeed attachment member connects the belt guide to the second conveyor.

Additionally, the base of the belt guide may include an arc shape. The arc shape of the base matches an arc shape of the first and second conveyors. The base of the belt guide may further include at least one alignment guide to position the belt. The belt forms a closed loop around the tension roller, the at least one alignment guide and the drive member. The closed loop may align the plurality of articles as the articles travel across the actuating frame between the first conveyor and the second conveyor.

An object of the invention can also be attained by a transfer device for transferring a flow of articles from an infeed conveyor drivable in a first direction to convey articles in the first direction to an outfeed conveyor substantially parallel to the infeed conveyor and drivable in a second direction opposite the first direction to convey articles in the second direction. The transfer device includes a frame having a first section, a second section and a third section. The third section is pivotally mounted to the second section and the second section is pivotally mounted to the first section. The frame is pivotally mounted in a space between a portion of the infeed and outfeed conveyors. The transfer device also includes a wheel rotatably mounted to the second section of the frame and drivingly engaged simultaneously by the infeed and outfeed conveyors. The wheel can be rotated relative to the frame when at least one of the infeed and outfeed conveyors moves so that the frame travels along the infeed and outfeed conveyors if a relative speed difference exists between the infeed and outfeed conveyors.

In addition, the transfer device includes an inner belt guide rotatably mounted around the wheel and an outer belt guide spaced from the inner belt guide defining between them a transfer path across the space between the portion of the infeed and outfeed conveyors. The transfer path conveys articles between the infeed and outfeed conveyors. The inner belt guide and the outer belt guide are each mourned to the frame so as to contact and guide articles from the inked conveyor to the outfeed conveyor along the transfer path. The outer belt guide is driven by the wheel and an outer drive gear on the first portion of the frame. The inner belt guide is driven by the wheel and an inner drive gear on the third portion of the frame. The inner drive gear may include at least one tension roller to engage the inner belt guide. A tension of the inner belt guide can be modified with the tension roller to accommodate the articles. The inner belt guide is able to contact the articles before the articles enter the transfer path.

Additionally, a portion of the infeed and outfeed conveyors may be curved. The transfer path has a curvature substantially concentric with a circumferential portion of the wheel. The transfer path also includes an inlet end on a portion of the infeed conveyor and an outlet end on a portion of the outfeed conveyor. The inner belt guide is in contact with articles at the inlet end and at the outlet end.

Other objects and advantages will be apparent to those skilled in the art from the following detailed description taken in conjunction with the appended claims and drawings.

BRIEF DESCRIPTION OF THE DRAWINGS

FIG. 4 is a top view of a belt guide for the transfer device according to the embodiment shown in FIG. 2; and.

DETAILED DESCRIPTION OF THE INVENTION

The present invention provides a dynamic spider guide that acts as a transfer device for transferring various articles between conveyors as part of an overall conveying system. The transfer device includes a belt guide to aid in organizing the flow of the articles to improve and increase the overall efficiency of the system.

Figure 1:
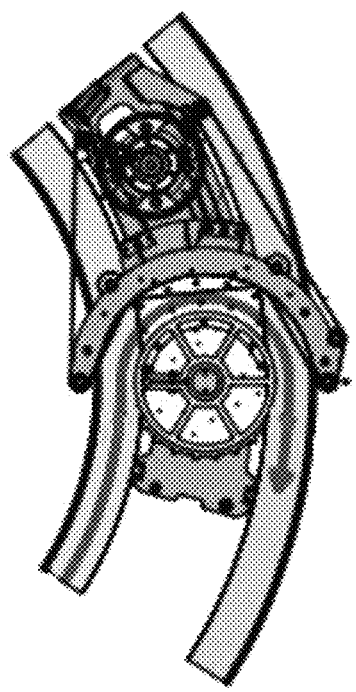
FIG. 1 is a top view of a transfer device for a conveyor system according to the prior art.

A transfer device, generally, as known in the art is shown in FIG. 1. Problems arise with such transfer devices as articles often slide off of an infeed conveyor chain. This can cause the articles to then hit a transfer wheel that is attempting to transfer articles from one conveyor chain to another traveling in an opposite direction. When the articles hit the transfer wheel it causes delays and back-ups for articles being transferred.

Figure 2:
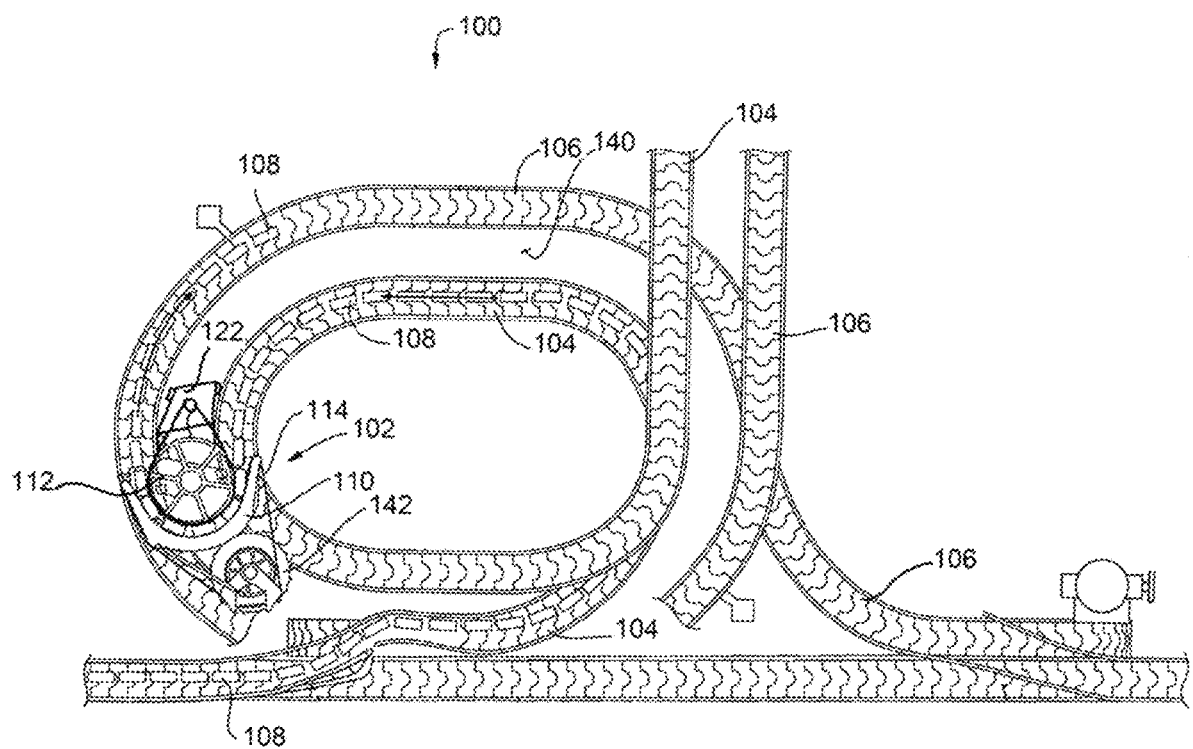
FIG. 2 is a top view of a transfer device on a conveyor system according to one embodiment of the invention.

An apparatus 100, as shown in FIG. 2 includes a transfer device 102 that allows for articles 108 that have slid away from a desirable position on a conveyor to be pushed back in place before the articles 108 enter the transfer device 102 without causing delays experienced by prior systems. The conveying apparatus 100 includes a first conveyor 104 as an infeed conveyor. The first conveyor 104 moves in a first direction (see arrows shown in FIG. 2) to convey the articles 108 throughout the apparatus 100. The apparatus 100 also includes a second conveyor 106 as an outfeed conveyor. The second conveyor 106 moves in a second direction (see arrows shown in FIG. 2), opposite the first direction. It is to be understood that the conveyors 104, 106 may be any conventional conveyors, such as, for example, link conveyors, belt conveyors and the like. The first and second conveyors 104, 106 are arranged in a side-by-side parallel relationship such that a consistent space 140 exists between the conveyors. Due to the parallel relationship between the conveyors 104, 106, the space 140 defined between them remains constant in size throughout the apparatus 100.

As shown in FIG. 2, the first conveyor 104 and second conveyor 106 receive and return articles 108 to the single conveying apparatus 100. However, the conveyors may also receive and return articles for individual inked and outfeed conveying systems if desired. The singular or multiple conveying systems may be operated by a variety of assemblies known in the art. For example, each conveyor may contain driver and diverter assemblies that may be fixed or movable for selective operation. It is also to be understood that while some embodiments of the invention, like the example shown in FIG. 2, relate to an accumulator system including oppositely moving and parallel conveyors for accumulating and storing articles between an upstream receiving station (infeed) and a downstream delivery station (outfeed), embodiments of the invention are not limited to any particular conveying system.

In one embodiment of the invention, the apparatus 100 includes the transfer device 102 as first shown in FIG. 2. The transfer device 102 includes a guide frame assembly 110 that is generally an actuating frame. The frame 110 can actuate, or pivot, certain elements relative to each other so that the transfer device 102 can move through both straight and curved portions of the space 140 between the conveyors 104, 106. The frame 110 acts as a base for carrying other elements of the transfer device 102 for holding and moving articles 108 between the conveyors 104, 106. The frame base is split into three connected portions, a first section 134, a second section 136 and a third section 138, as shown in FIG. 3.

Figure 3:
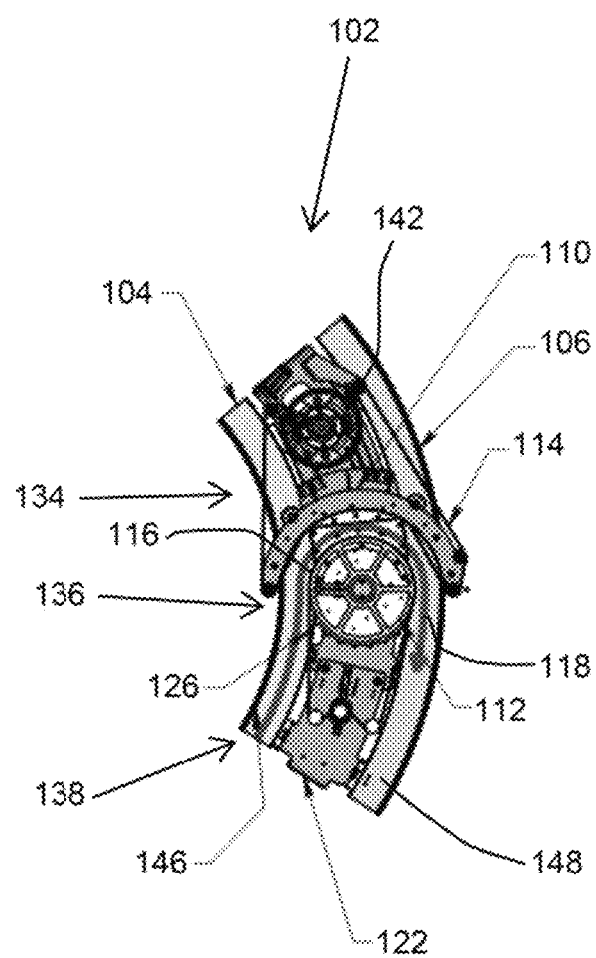
FIG. 3 is a top view of the transfer device according to the embodiment shown in FIG. 2.

As shown now in FIG. 3, these three sections 134, 136, 138 of the transfer device 102 are connected together and pivot about each other to move throughout the apparatus 100. The sections may be connected to each other by any reasonable means such as by bolts, hinges, welding or any other suitable attachment means. The first section 134 generally includes an outer guide 114. In some embodiments of the invention, the outer guide 114 may be a belt. An outer drive gear 142 rotates freely on the first section 134 and serves as an input to the transfer device 102 to aid in moving the transfer device 102 along the conveyors 104, 106. The outer drive gear 142 also aids to move the outer guide 114. Accordingly, when the outer drive gear 142 is rotated due to a speed difference between the first conveyor 104 and the second conveyor 106, the outer guide 114 is in turn rotated. The outer guide 114 is wrapped around a portion of the outer drive gear 142 and a portion of the actuating frame 110.

The second section 136 generally includes a drive member 112. In some embodiments of the invention the drive member 112 may be a wheel. The drive member 112 includes an inner guide 116 to work in conjunction with the outer guide 114 of the first section 134. The inner guide 116 may be included as part of the wheel 112 or may be a separate component added. In one embodiment of the invention the inner guide 116 is at least one, wheel mounted to rotate freely relative to the second section 136 on the frame 110. In other embodiments, multiple wheels may be used, mounted coaxially on top of one another, to modify the transfer device 102 to accommodate articles of varying heights. The first section 134 and second section 136 of the transfer device 102 meet to form a transfer path 118 through which articles 108 pass from the infeed conveyor 104 to the outfeed conveyor 106. The outer guide 114 is curved to match the circumference of the wheel 112. That way, the outer guide 114 and the wheel 112 form a path that is parallel for the articles to move between.

Figure 4:
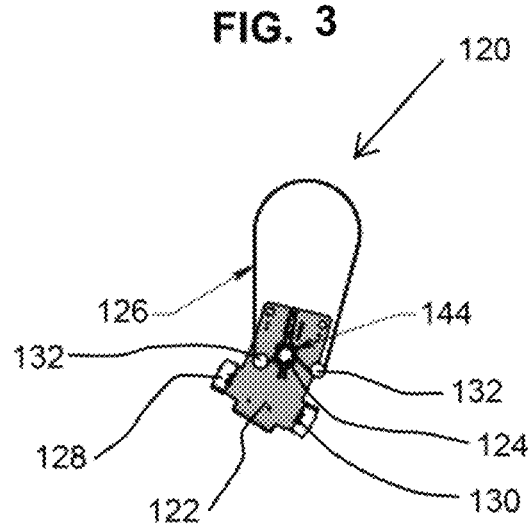

The third section 138 generally includes a belt guide 120, as shown in FIG. 4 which aids the articles 108 through the transfer path 118. The belt guide 120 includes a base 122 that is pivotally attached to the second section 136 of the transfer device 102 (see FIGS. 3-4). The belt guide 120 also includes a tension roller 124, a belt 126 and at least one alignment guide 132. The belt 126 is added to the transfer device 102 to provide an assisted guide to the infeed conveyor 104 as an add-on option. The at least one alignment guide 132 and the tension roller 124 are attached to the base 122 of the belt guide 120. As shown in FIG. 4, the belt 126 forms a loop protruding from the base 122 of the belt guide 120. The at least one alignment guide 132 (such as the two alignment guides 132 shown in FIGS. 3-4) aid to control the positioning of the belt 126 while the tension roller 124 also interacts with the belt 120 to adjust and control the tension of the belt 120. In some embodiments of the invention, the tension miler 124 may be slideable to different positions along the base 122. An inner drive gear 144 may also be installed to operatively control the tension roller 124. The number of alignment guides 132 and positioning of said alignment guides and the tension roller 124 may be modified to accommodate various sizes, types and strengths of belts used for the belt guide 120. Such components may also be modified according to various sizes, shapes and weights of articles or packages being conveyed through the transfer device 102.

The base 122 of the belt guide 120 also includes an infeed attachment member 128 and/or an outfeed attachment member 130. The infeed attachment member 128 engages with an edge or underside of the infeed conveyor 104 to aid in positioning and attaching the third section 138 of the transfer device 102 to the conveyor system 100. The outfeed attachment member 130 engages with an edge or underside of the outfeed conveyor 106 to aid in positioning and attaching the third section 138 of the transfer device to the conveyor system 100. In one embodiment of the invention, the attachment members may be in the form of slides to assist in maintaining the desired alignment of the transfer device between the conveyors. As also shown in FIG. 3, the loop of the belt 126 wraps around the drive member or wheel 112 of the second section 136 of the frame 110. The belt 126 rotates about the wheel 112, the at least one alignment guide 132 and the tension roller 124. The rotation of the bell 126 may be powered by the wheel 112, the inner drive gear 144, or a combination of the two. Adding the belt 126 to the transfer wheel 112 assists the transfer device 102 with moving packages 108 along the infeed conveyor 104 and reduces or eliminates a delay or back-up to the system 100 by directing packages or articles 108 so that the articles 108 do not, hit or bump up against the drive member 112.

As also shown in FIG. 3, an inlet end 146 on the first conveyor 104 is located at the most down-stream portion (third section 138) of the transfer device. Here, the transfer path 118 begins where articles contact the belt 126 prior to entering the curvature of the transfer path 118 between the drive member wheel 112 and the outer belt guide 114. As an pass through the transfer path 118, they proceed to an outlet end 148 on the second conveyor 106 where the articles exit the transfer device 102 and proceed down the second conveyor 106 in the opposite direction from which the articles came. During any position, the transfer path 118 is maintained due to the pivotal nature of the frame 110 and the frames sections 134, 136, 138. This pivotal nature maintains the transfer path in the space between conveyors regardless of the position of the transfer device relative to straight or curved sections of the conveyors. The steady distance maintains a constant speed to convey articles as the transfer device moves along the conveyors.

Figure 5:
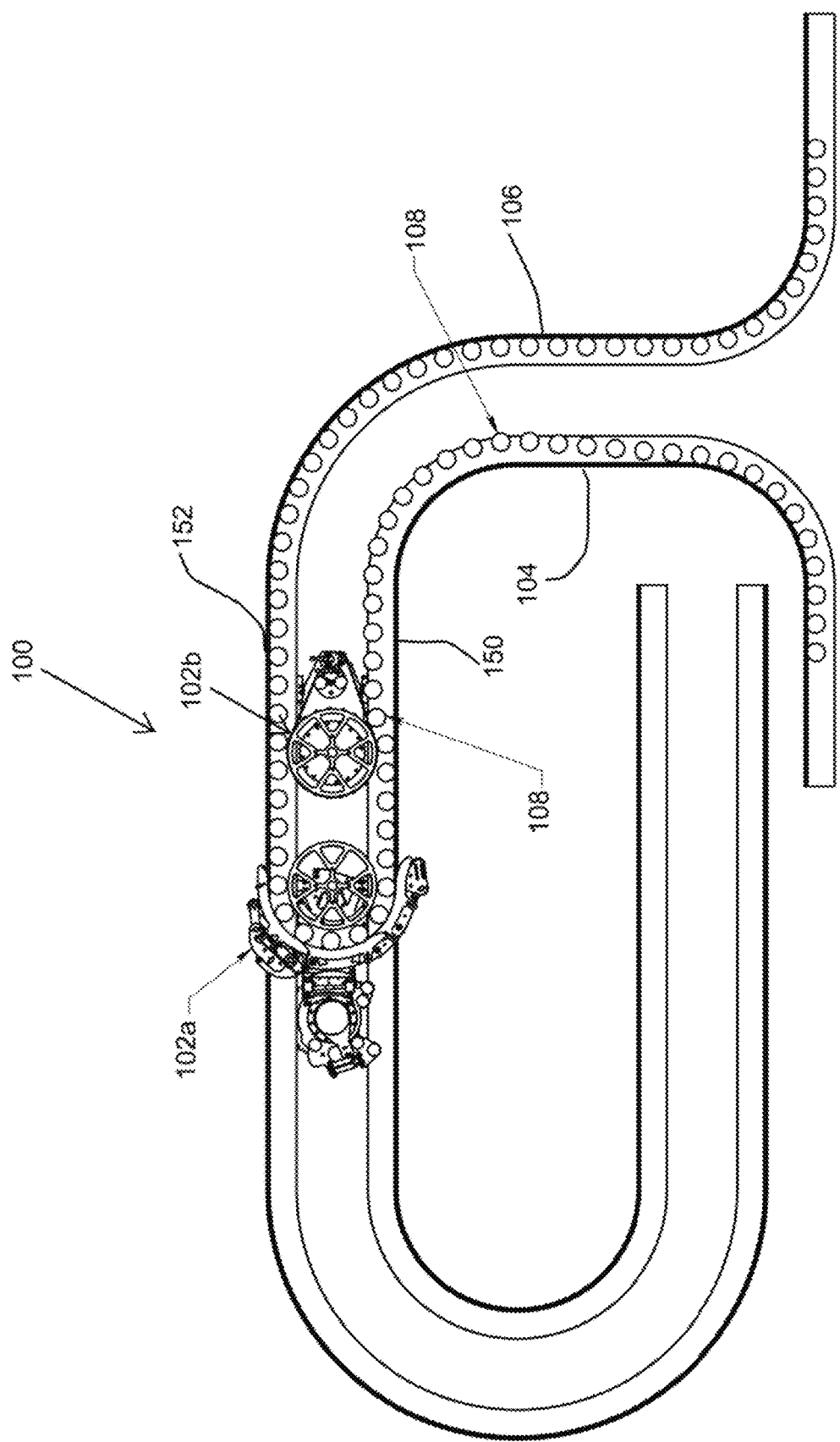
FIG. 5 is a top view of two transfer devices on a conveyor system according to one embodiment of the invention.

FIG. 5 shows an apparatus 100 that includes two transfer devices 102a, 102b. The downstream transfer device 102b first contacts articles 108 from the first conveyor 104 prior to the articles 108 contacting the upstream transfer device 102a to then proceed to the second conveyor 106.

In some embodiments of the invention a fence or ledge may be added to the infeed and/or outfeed conveyors and the belt 126 may push the articles hack against the fence to prevent delay caused by hitting the transfer wheel, Packages may be pushed back against the fence in a controlled manner without delay or sliding back on the infeed conveyor. The addition of the downstream transfer device 102b facilitates this movement and control by pushing articles 108 towards an outer wall 150 of the first conveyor 104 prior to the articles entering the upstream transfer device 102a. Likewise, the downstream transfer device 102b facilitates seamless movement of articles 108 after they pass through transfer device 102a by keeping the articles against an outer wall 152 of the second conveyor 106. The transfer devices 102a and 102b may share a belt and/or belt guide, or have separate belt and/or belt guides.

The invention illustratively disclosed herein suitably may be practiced in the absence of any element, part, step, component, or ingredient which is not specifically disclosed herein. While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed:
1. An apparatus for controlling the flow of articles, comprising:
   a first conveyor driven in a first direction to convey articles in the first direction;
   a second conveyor driven in a second direction to convey articles in the second direction, wherein the second direction is opposite the first direction;
   a transfer device disposed generally across and movable along the first and second conveyors, the transfer device having an actuating frame adapted to pivot about the first and second conveyors, a drive member rotatably mounted to the actuating frame and drivingly engaged by the first and second conveyors, and an outer guide and an inner guide configured to define a transfer path for a plurality of articles to travel across the actuating frame between the first conveyor and the second conveyor so that, the drive member continuously rotates as either of the first and second conveyors move and the transfer device travels along the first and second conveyors if a speed difference exists between the first and second conveyors; and
   a belt guide attached to the transfer device, the belt guide including a base configured to attach to the actuating frame of the transfer device downstream of the drive member and a tension roller that slideably engages with a portion of the base.

2. The apparatus for controlling the flow of articles according to claim 1 wherein the belt guide further comprises a belt wherein the belt is operatively connected to the tension roller.

3. The apparatus for controlling the flow of articles according to claim 2 wherein the belt is configured to wrap around a portion of the drive member along the transfer path.

4. The apparatus for controlling the flow of articles according to claim 1 wherein the belt guide is removably attached to the transfer device.

5. The apparatus for controlling the flow of articles according to claim 1 wherein the base of the belt guide further comprises an infeed attachment member wherein the infeed attachment member connects the belt guide to the first conveyor.

6. The apparatus for controlling the flow of articles according to claim 1 wherein the base of the belt guide further comprises an outfeed attachment member wherein the outfeed attachment member connects the belt guide to the second conveyor.

7. The apparatus for controlling the flow of articles according to claim 1 herein the base or the belt guide comprises an arc shape and wherein the arc shape of the base matches an arc shape of the first and second conveyors.

8. The apparatus for controlling the flow of articles according to claim 1 wherein the base of the belt guide further comprises at least one alignment guide to position the belt.

9. The apparatus for controlling the flow of articles according to claim 8 wherein the belt forms a closed loop around the tension roller, the at least one alignment guide and the drive member.

10. The apparatus for controlling the flow of articles according to claim 9 wherein the closed loop is configured to align the plurality of articles as the articles travel across the actuating frame between the first conveyor and the second conveyor.

11. The apparatus for controlling the flow of articles according to claim 1 further comprising an additional transfer device wherein the additional transfer device contacts the plurality of articles downstream of the transfer device.

12. A transfer device for transferring a flow of articles from an infeed conveyor drivable in a first direction to convey articles in Me first direction to an outfeed conveyor substantially parallel to the inked conveyor and drivable in a second direction opposite the first direction to convey articles in the second direction, the transfer device comprising:
a frame having a first section, a second section and a third section wherein the third section is pivotally mounted to the second section and the second section is pivotally mounted to the first section, and wherein the frame is pivotally mounted in a space between a portion of the infeed and outfeed conveyers;
a wheel rotatably mounted to the second section of the frame and drivingly engaged simultaneously by the inked and outfeed conveyors, the wheel being rotated relative to the frame when at least one of the infeed and outfeed conveyors moves so that the frame travels along the infeed and outfeed conveyors if a relative speed difference exists between the infeed and outfeed conveyors;
an inner belt guide rotatably mounted around the wheel; and
an outer belt guide spaced from the inner bolt guide defining between them a transfer path across the spare between the portion of the inked and outfeed conveyors wherein the transfer path conveys articles between the infeed and outfeed conveyors.

13. The transfer device according to claim 12 wherein the inner belt guide and the outer belt guide are each mounted to the frame so as to contact and guide articles from the infeed conveyor to the outfeed conveyor along the transfer path.

14. The transfer device according to claim 13 wherein the outer belt guide is driven by the wheel and an outer drive gear on the first portion of the frame.

15. The transfer device according to claim 13 wherein the inner belt guide is driven by the wheel and an inner drive gear on the third portion of the frame.

16. The transfer device according to claim 15 wherein the inner drive gear comprises at least one tension roller to engage the inner belt guide wherein a tension of the inner belt guide is modified with the tension roller to accommodate the articles.

17. The transfer device according to claim 12 wherein the inner belt guide contacts the articles before the articles enter the transfer path.

18. The transfer device according to claim 12 wherein the portion of the infeed and outfeed conveyors is curved.

19. The transfer device, according to claim 12 wherein the transfer path has a curvature substantially concentric with a circumferential portion of the wheel.

20. The transfer device according to claim 12 wherein the transfer path comprises an inlet end on a portion of the infeed conveyor and an outlet end on a portion of the outfeed conveyor.

21. The transfer device according to claim 20 wherein the inner belt guide is in contact with articles at the inlet end and at the outlet end.

* * * * *